(12) United States Patent
Berkouk et al.

(10) Patent No.: US 9,306,422 B2
(45) Date of Patent: Apr. 5, 2016

(54) ROTOR BLADE SET OF AN ELECTRIC MOTOR

(71) Applicant: Brose Fahrzeugteile GmbH & Co. KG, Wuerzburg, Wuerzburg (DE)

(72) Inventors: Maurad Berkouk, le conquet (FR); Sylvain Cordrie, Estenfeld (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 0 days.

(21) Appl. No.: 14/311,927

(22) Filed: Jun. 23, 2014

(65) Prior Publication Data

US 2014/0300243 A1    Oct. 9, 2014

Related U.S. Application Data

(63) Continuation of application No. PCT/EP2012/005168, filed on Dec. 14, 2012.

(30) Foreign Application Priority Data

Dec. 23, 2011 (DE) .......................... 10 2011 122 023

(51) Int. Cl.
  *H02K 1/06* (2006.01)
  *H02K 1/27* (2006.01)
  *H02K 1/28* (2006.01)

(52) U.S. Cl.
  CPC .................. *H02K 1/276* (2013.01); *H02K 1/06* (2013.01); *H02K 1/2773* (2013.01); *H02K 1/28* (2013.01); *H02K 2201/09* (2013.01)

(58) Field of Classification Search
  CPC ............. H02K 1/06; H02K 1/27; H02K 1/28; H02K 1/2706; H02K 1/276; H02K 1/2773
  IPC ............... H02K 1/06,1/27, 1/28, 1/2706, 1/276, H02K 1/2773
  See application file for complete search history.

(56) References Cited

U.S. PATENT DOCUMENTS 5,581,140 A    12/1996 Futami et al.
5,894,182 A *  4/1999 Saban ...................... H02K 1/06
                                                        310/216.013

(Continued)

FOREIGN PATENT DOCUMENTS

CN          1326254 A    12/2001
CN        101447705 A     6/2009

(Continued)

OTHER PUBLICATIONS

Chinese Office Action for Chinese Application No. 201280064080.6 dated Nov. 12, 2015—English translation.

*Primary Examiner* — Dang Le
(74) *Attorney, Agent, or Firm* — Muncy, Geissler, Olds & Lowe, P.C.

(57) ABSTRACT

A rotor blade set for an electric motor, having a plurality of axially assembled multi-part and/or single-part blades having circle segment shaped blade sections, between which radial and circumferentially open recesses are formed for receiving a respective magnet, wherein a predeterminable number of blade sections of the single-part or multi-part blades have at least one azimuthal clip on the circle radius, which clip bends axially during the insertion of the corresponding magnet into the respective recess, and wherein the circle segment-shaped blade sections of the single-part or multipart blades have at least one notch on the circle radius, in which notch a corresponding clip of a blade section of an axially spaced blade engages following the axial bending.

19 Claims, 4 Drawing Sheets

(56) References Cited

U.S. PATENT DOCUMENTS

| | | |
|---|---|---|
| 6,794,784 B2 | 9/2004 | Takahashi et al. |
| 7,098,564 B2 | 8/2006 | Gehring et al. |
| 7,247,967 B2 * | 7/2007 | Ionel .................. H02K 1/148 310/216.086 |
| 7,709,991 B2 * | 5/2010 | Ionel et al. ............. 310/216.001 |
| 7,800,272 B2 * | 9/2010 | Nakayama et al. ...... 310/156.56 |
| 8,026,648 B2 | 9/2011 | Abel et al. |
| 8,823,239 B2 | 9/2014 | Ossenkopp et al. |
| 2002/0047435 A1 * | 4/2002 | Takahashi et al. ....... 310/156.56 |
| 2006/0108891 A1 | 5/2006 | Fujita |
| 2010/0277017 A1 * | 11/2010 | Alexander .......... H02K 1/2773 310/61 |

FOREIGN PATENT DOCUMENTS

| | | |
|---|---|---|
| DE | 101 08 192 A1 | 8/2002 |
| DE | 103 57 502 A1 | 7/2005 |
| DE | 10 2005 041 676 A1 | 3/2007 |
| DE | 10 2007 029 719 A1 | 8/2008 |
| DE | 10 2008 004 876 A1 | 8/2008 |
| DE | 10 2007 024 406 A1 | 11/2008 |
| DE | 10 2008 044 127 A1 | 6/2009 |
| DE | 10 2009 003 228 A1 | 12/2009 |
| DE | 10 2008 043 138 A1 | 4/2010 |
| DE | 10 2009 045 101 A1 | 4/2011 |
| DE | 10 2010 022 702 A1 | 12/2011 |
| DE | 10 2010 030 326 A1 | 12/2011 |
| EP | 1 223 658 A1 | 7/2002 |
| JP | 2003-219585 A | 7/2003 |
| JP | 2008-011615 A | 1/2008 |
| JP | 2009-296859 A | 12/2009 |
| JP | 2010-239692 A | 10/2010 |
| JP | 2011-172441 A | 9/2011 |

\* cited by examiner

ROTOR BLADE SET OF AN ELECTRIC MOTOR

This nonprovisional application is a continuation of International Application No PCT/EP2012/005168, which was filed on Dec. 14, 2012, and which claims priority to German Patent Application No 10 2011 122 023.6, which was filed in Germany on Dec. 23, 2011, and which are both herein incorporated by reference.

BACKGROUND OF THE INVENTION

1. Field of the Invention

The invention relates to a rotor blade set for an electric motor, including a plurality of axially assembled, multi-part and/or single-part blades having circle segment-shaped blade sections, between which radial and circumferentially open recesses are provided for receiving a magnet.

2. Description of the Background Art

Electric motors having blade sets of this type are frequently used as low-power motors in motor vehicles, where they are employed, in particular, as power steering motors or adjustment drives. While the rotor concentrically surrounds the stationary stator in an electric motor as a so-called external rotor motor, the stator is disposed coaxially to the rotating rotor in an internal rotor motor, forming an air gap.

In a permanently excited, brushless DC motor, the rotor has a number of permanent magnets, while the stator includes, for example, a three phase-connected coil winding, which is activated by means of pulse-width modulated currents. If the rotor is provided with the magnets, they may be held on the blade set of the rotor by means of clamping and/or gluing. The blade set comprises a plurality of punch-packed, individual blades (blade laminates).

The assembly of a rotor blade set from single/multi-piece or single/multi-part blades having circle segment-shaped blade sections is known from EP 1 223 658 A1 and from DE 10 2007 024 406 A1. For this purpose, a first single-piece (single-part) blade type has web-like connecting areas between the blade sections on the inner and/or outer circumferential side(s). A second multi-piece (multi-part) blade type comprises, for practical purposes, the individual blade sections not connected to each other. The axially stacked blades are connected to each other in the manner of a punch packed system, with the aid of engaging (bead-like) recesses and projections stamped into the blade sections. Radial, circumferentially open recesses, which are axially aligned with the packed blade stack and form receiving pockets for permanent magnets, are provided between the blade sections.

A rotor is known from DE 103 57 502 A1, which corresponds to U.S. Pat. No. 8,026,648, which is assembled in the axial direction from a blade set made of identically shaped individual blades, magnets inserted into receiving pockets of the rotor being held on projections provided on the narrow sides of the receiving pockets.

In the blade sets known from DE 10 2007 029 719 A1, pocket openings of individual blades carry a clamping clip either on both narrow sides or on only one narrow side, which, however, is always the same side.

A rotor stacked from individual blades, including receiving pockets for magnets, is also known from U.S. Pat. No. 5,581,140. Clamping clips for fixing the magnets by clamping are provided on the longitudinal sides of the receiving pockets, the clamping clips not being provided in each blade position but only in every third or fourth blade position.

SUMMARY OF THE INVENTION

It is therefore an object of the invention to improve a rotor blade set of the aforementioned type. In particular, a reliable hold of the blades to each other as well as, in particular, that of the magnets within the blade set, is to be easily facilitated.

The rotor blade set according to an embodiment of the invention for an electric motor is assembled from a plurality of blades having radial recesses for forming receiving pockets for one magnet (permanent magnet) each, i.e., disposed axially above each other (stacked). A predefinable first number of single-piece i.e., single-part, blades and a predefinable second number of multi-piece or multi-part, blades are each provided with circle segment-shaped blade sections. Each of these blade sections accommodates one circle sector (circle segment) and thus a partial surface of the circular surface of the particular blade, each blade section being delimited by a circle arc and two circle radii, which, in turn, radially delimit the magnet recesses.

The single-part blades can have a blade section on the inner circumferential side, which has a central material recess for passage of a shaft. The circle segment-shaped blade sections of the single-part blades are molded in the manner of spokes onto this annular blade section by means of blade webs. The multi-part blades also preferably have a blade section provided with a central material recess for passage of a shaft on the inner circumferential side, onto which at least some of the circle segment-shaped blade sections are molded, preferably in the blade circumferential direction of each second blade section, by means of blade webs.

The circle segment-shaped blade sections of all blades are practically the same with respect to their segment size, so that the recesses remaining between their circle radii in the stacked blade set are aligned axially and form radial receiving pockets for the permanent magnets. A predefinable number of blade sections, preferably only the multi-part blades, have at least one, preferably two, axially bendable clips on the circle radius side, i.e., along the circle radii of the particular blade segments. The particular clip projects into the magnet recess delimited by this circle radius or this blade section edge.

Each of the axially bendable clips (joining clips) of each corresponding circle segment-shaped blade section of the particular blade is advantageously formed by two notches introduced into the blade section edge—i.e., on the circle radius side—which flank the particular clip on both sides. The particular clip runs azimuthally, i.e., in the blade circumferential direction, and projects beyond the particular circle radius-side blade section edge of the corresponding blade section. The clips or joining clips may thus be easily manufactured during the course of the punching process and may be introduced into the corresponding circle segment-shaped blade section.

In an embodiment, only some of the circle segment-shaped blade sections are provided with clips of this type. At least two blade sections, which are referred to below as a blade section pair, preferably each have a clip on one of the two circle radii or blade section edges. Two directly adjacent blade section pairs are particularly preferably provided once or twice, of which one blade section is assigned to both blade section pairs and has one clip on each side of its circle radii or blade section edges. These two clips are disposed in radially offset positions along the particular circle radius. The two blade sections adjacent to this middle blade section having two clips each have, on the circle radius facing the middle blade section, only one individual clip which is provided directly opposite the opposite clip of the central blade section in a tangential or azimuthal manner.

Each circle segment-shaped blade section of the particular single-piece blade advantageously has at least one notch (joining notch) and preferably at least one notch or joining notch on each circle radius. In particular, the circle segment-shaped blade sections of the particular blade preferably have two notches on each circle radius, which are located directly opposed to the notches of an adjacent blade section in an azimuthal or tangential manner. The clips and notches of all circle segment-shaped blade sections of each blade type (single-part or multi-part) are always located in the very same grid, so that clips and notches within the rotor blade set are always disposed axially above one another and are thus axially aligned.

As a result, a clip which is axially bent during the course of inserting a magnet into the corresponding receiving pocket of the rotor blade set, formed by the recesses in the individual blades, always engages with one or multiple axially underlying notches and therefore is able to penetrate therein. The clips therefore at least partially enter the underlying notches, which causes the affected blades and individual bade sections to be particularly advantageously held together in the rotor blade set (blade stack). The clips and notches thus take on a multiple function, namely a clamping fixation of the magnets in the receiving pockets, on the one hand, and the holding together of the affected blades or blade sections, on the other hand. Another function of the clips and notches is to center the blades or blade sections within the blade set or blade substack.

In this connection, in particular, one especially advantageous embodiment provides for designing the notch or each notch in the shape of a trapezoid. This design of the shape of the notches is such that, in particular, at least the particular clip is deformed during the course of its axial bending. The clip and the particular notch are preferably mechanically deformed oppositely (alternately). This measure increases the effect of the blade adhesion or the blade or blade section centering.

If the blades are offset from each other or rotated around a circle segment angle from one blade position to another blade position during the course of stacking, clips always line up with corresponding notches, into which the clips maybe axially bent, in all blade sections located on top of each other. In this manner, all blades contained within a corresponding blade substack, for example, are joined together as well as held non-rotatably against each other, centered and secured against each other to prevent radial shifting. Due to the design of the circle segment-shaped blade sections having clips and/or notches, single-part and multi-part blades may be stacked in axially different sequences as well as joined together in groups or subsets which include different combinations of single-part and multi-part blades.

In the blade set formed in this manner, the recesses between the circle segment-shaped blade sections of the blades are aligned with each other and form the receiving pockets extending in the axial direction for the permanent magnets. The latter are held in place within these receiving pockets by means of a clamp fixing with the aid of the clips. Due to the arrangement of the blades rotated in a targeted manner in the set circumferential direction, all receiving pockets are provided with a number of clips. In addition, additional clips (clamping clips), which are molded onto the circular blade ring section, i.e., the annular blade section having a central material recess for the passage of a shaft of the particular blade and which project radially into the corresponding recess of this blade, are provided on at least some of the blades stacked within the blade set. Each of these blades suitably has only two clamping clips of this type, which are disposed diametrically opposed to each other.

If the blades are stacked so that they are offset from each other or rotated around the central blade axis, the circle segment angle or the rotation or offset angle corresponds to the fraction of 360° which occupies the partial surface formed by one circle segment-shaped blade section and one recess. In a blade arrangement having, for example, ten circle segment-shaped blade sections—and thus in a rotor blade set for accommodating ten magnets—the circle segment angle is 36°. Based on a segmentation of this type, when forming a blade set or blade subset, multiple blades may be stacked, offset from each other by a circle segment angle of 36°, and joined together with the aid of the clips and notches. All participating, circle segment-shaped blade sections disposed above one another are reliably held against each other with a minimal yet sufficient number of clips. Due to the targeted positioning of the clips and notches, a collision of the clips is avoided hereby.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
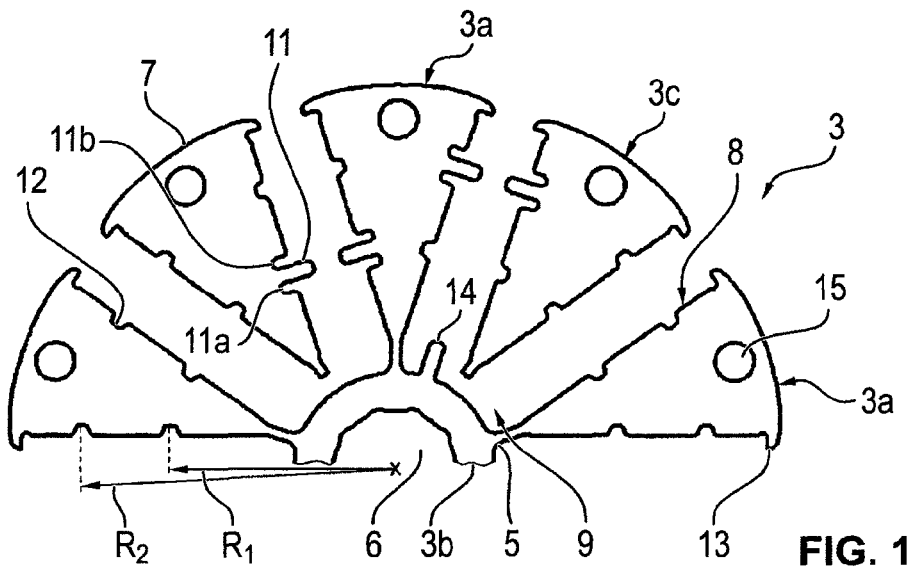
FIG. 1 shows a top view of one half of a multi-part blade, including circle segment-shaped blade sections as well as clips (joining clips) and notches (joining notches)
Figure 2:
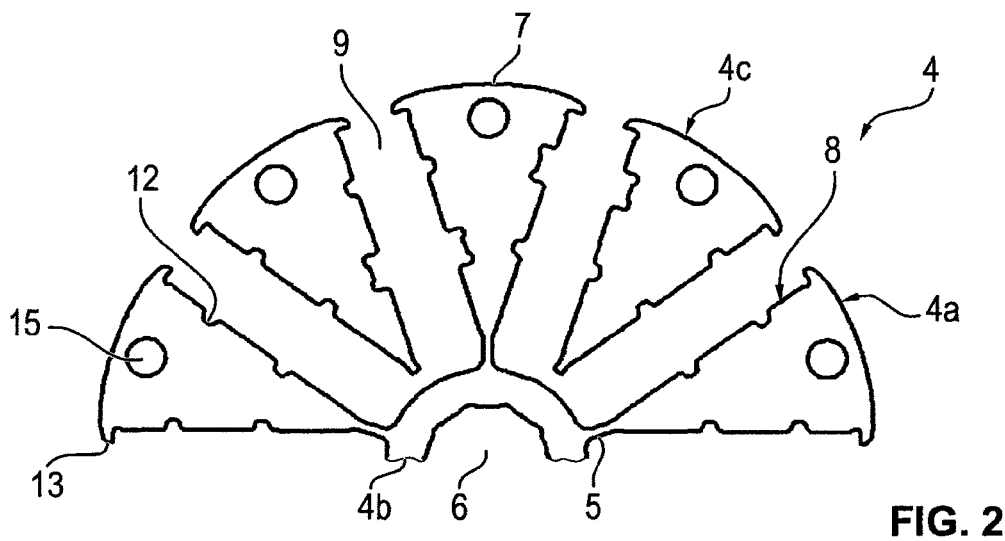
FIG. 2 shows a multi-part blade comprising a corresponding number of circle segment-shaped blade sections, including notches (joining notches), in a representation according to FIG. 1.
Figure 3:
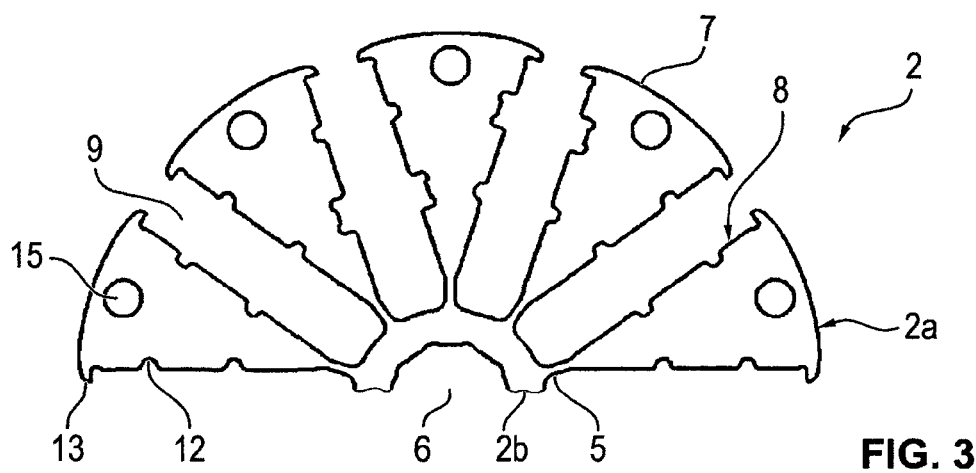
FIG. 3 shows a single-part blade comprising a corresponding number of circle segment-shaped blade sections, including notches (joining notches), in a representation according to FIG. 1.
Figure 7:
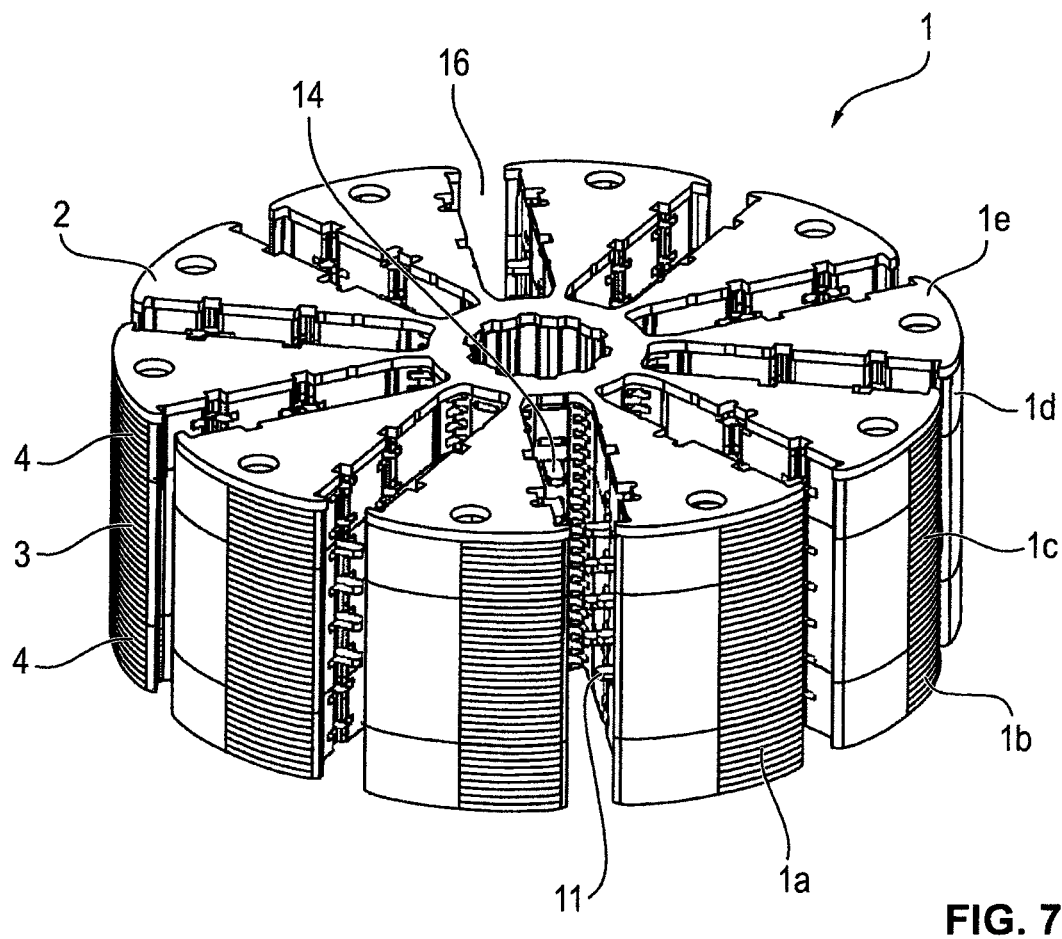
FIG. 7 shows a perspective view of a rotor blade set comprising blade subsets.
Figure 8:
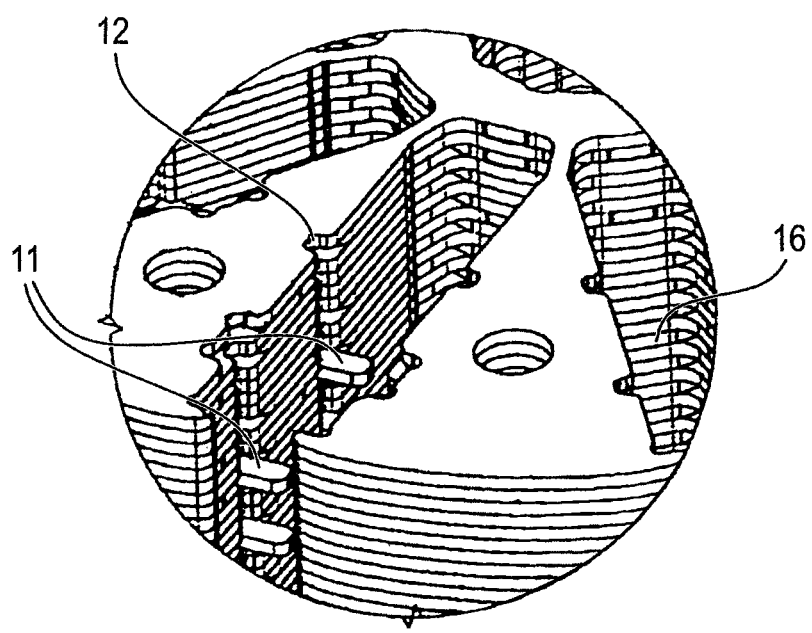
FIG. 8 shows a detail of the rotor blade set on a larger scale.

FIGS. 7 and 8 show (details) of a rotor blade set 1, including single-part blades 2 according to FIG. 3 as well as multi-part blades 3, 4 according to FIGS. 1 and 2, respectively. One-part and multi-part blades 2 or 3 and 4 are stacked in different sequences: according to FIG. 7, from bottom to top in subsets or blade substacks 1a through 1e, including a subset 1a comprising, for example, three one-part blades 2 according to FIG. 3, and a blade subset 1b comprising multiple multi-part blades 4 according to FIG. 2, as well as a subset 1c comprising multiple multi-part blades 3 according to FIG. 1, and a subset 1d, in turn, comprising multiple multipart blades 4 according to FIG. 2, as well as a subset 1e, included, for example, only one single-part blade (terminating blade) 2 according to FIG. 3.

Subsets 1b and 1d are formed, for example, from six to nine or from eight multi-part blades 4 according to FIG. 2, while middle subset 1c is assembled from twenty multi-part blades 3 according to FIG. 1. Rotor blade set 1 is part of a rotor of an electric motor, which is not illustrated in greater detail, in particular a drive or an adjustment drive of a motor vehicle.

Figure 4:
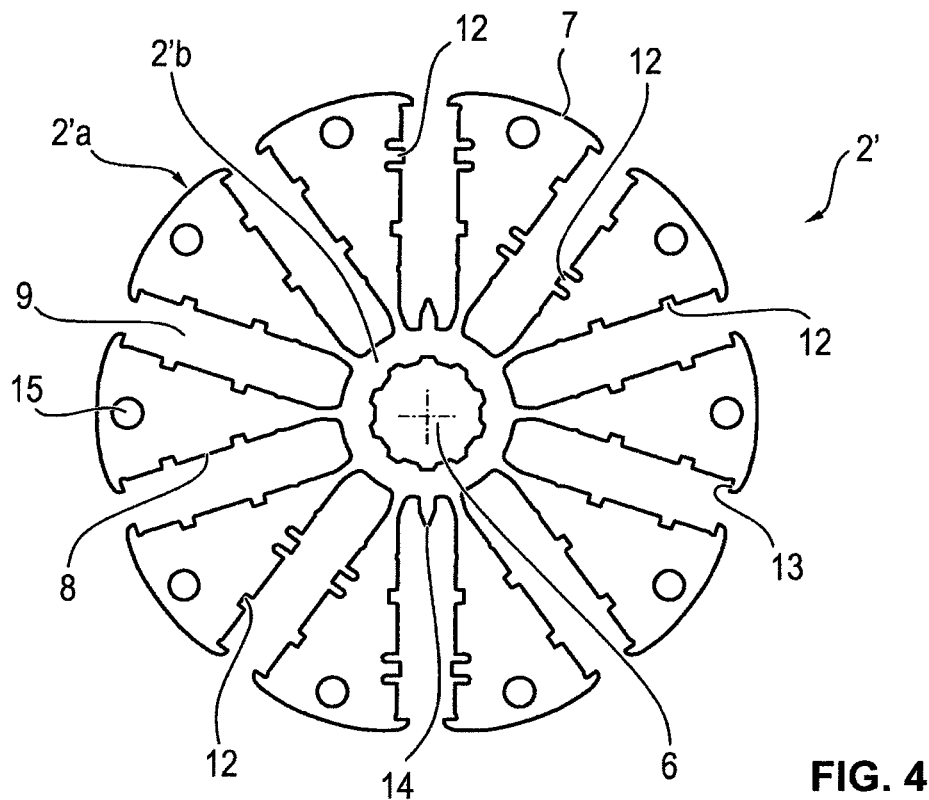
FIG. 4 shows a top view of a single-part blade comprising circle segment-shaped blade sections, including clips (joining clips) and notches (joining notches)
Figure 5:
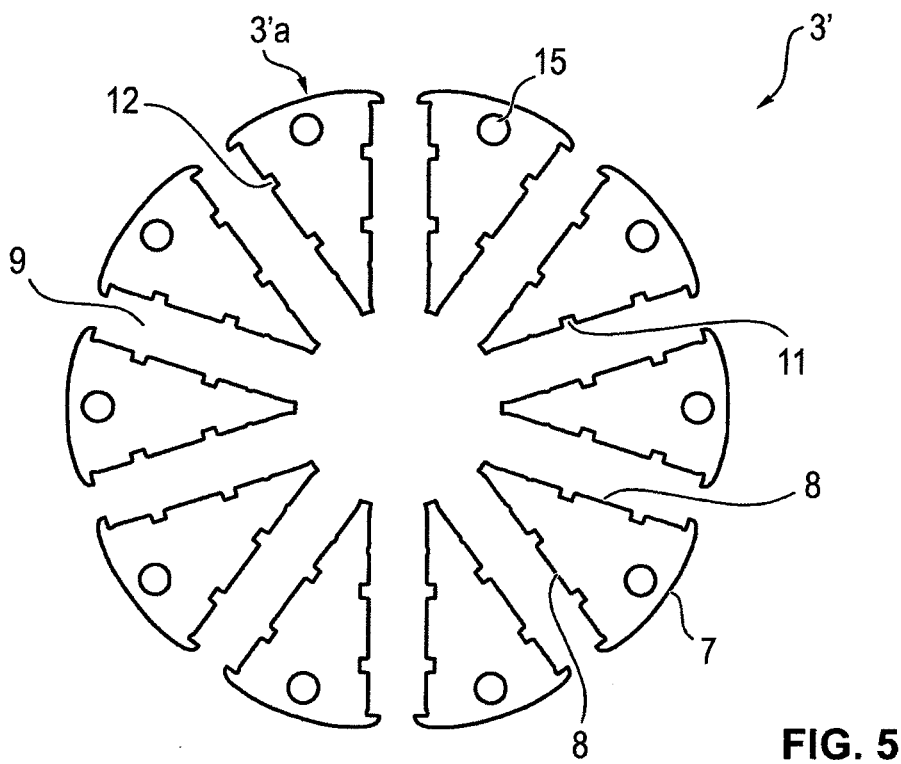
FIG. 5 shows a top view of a multi-part blade comprising a corresponding number of circle segment-shaped blade sections, including notches (joining notches)

FIGS. 4 and 5 show alternative designs of a one-part and a multi-part blade 2' and 4'.

Figure 6:
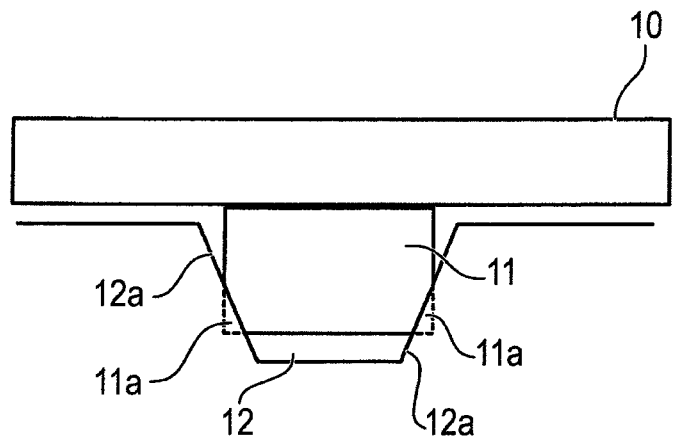
FIG. 6 shows a schematic representation of a joint between a deforming clip and notch under the action of a permanent magnet.

Multi-part blade 3 illustrated in FIG. 1 has a number of circle segment-shaped blade sections 3a, for which every second blade section 3a—viewed in the blade circumferential direction—is molded via a blade web 5 onto a central annular blade section 3b having a material recess 6 for the passage of the shaft of the rotor of the electric motor. Remaining blade sections 3c are not connected to central blade section 3b. Each circle segment-shaped blade section 3a, 3c forms a partial surface, delimited by one circle arc 7 and two circle radii 8, of the circle surface occupied by blade 3. Circle radii 8, which are also referred to below as blade section edges, each delimit a radial recess 9 for permanent magnets (radial magnets), radially disposed in rotor blade set 1, of which one magnet 10 is illustrated in FIG. 6.

Some of circle segment-shaped blade sections 3a, 3c have azimuthal or tangential clips (joining clips) 11 along their blade section edges 8, while all blade sections 3a, 3b are provided with notches (joining notches) 12 in the region of their blade section edges 8. Clips 11 and notches 12 are provided in a certain radial grid, which corresponds to the notch grid of blades 2 through 4' illustrated in FIGS. 2 through 5. In the region of circle arc 7 of particular blade section 3a, 3c, azimuthally or tangentially oriented hooks (tangential hooks) 13 are molded or provided thereon, which prevent magnets 10 from sliding radially out of recesses 9.

It is apparent that only some of segment-shaped blade sections 3a have clips 11 of this type. Only two groups of three directly adjacent blade sections 3a, 3c, and thus a total of six blade sections 3a, 3c, in four blade section pairs, each have one clip 11 or two clips 12.

Only one such group of three directly adjacent blade sections 3a, 3c having clips 11 is illustrated in FIG. 1, while the second group is assigned to the second half of blade 3, which is not illustrated. Blade sections 3a provided with two clips 11 each have one clip 11 on both circle radii 8, which are offset radially from each other. In this radial position, clips 11 of adjacent blade sections 3c, in turn, are located diametrically opposed to each other.

Blade sections 3a, 3c designed with clips 11 also have notches 12 in their radially exposed locations or positions. Remaining blade sections 3a are clip-free and each have two notches 12 on both circle radii 8 in radially offset positions in the same notch and clip grid. All notches 12 and clips 11 are radially positioned in such a way that clips 11 and/or notches 12 are diametrically opposed to each other in the region of each recess 9. In other words, clips 11 or notches 12 of all blade sections 3a, 3c are located on a circumferential circle having a first radius (first radial or grid position) $R_1$ or a second radius (second radial or grid position) $R_2$.

Moreover, multi-part blade 3 according to FIG. 1 has at least one, preferably two, radial clamping clips 14, which are positioned offset by 180° and which are molded onto central blade section 3b and project into corresponding recess 9. Single-piece blade 2' according to FIG. 4 may also have two such clamping clips 14' in diametrically opposed positions.

Circular material recesses 15 are introduced into segment-shaped blade sections 3a. They are used to reduce the shunt inductance and, in particular, serve as a mounting aid or for fixing blades 2 and 4' in blade stack 1, for example with the aid of threaded bolts or the like.

Each of clips 11 is formed by one notch pair 11a, 11b on both sides of particular clip 11 in the region of blade section edge 8. Clips 11 are thus punched out of particular blade section 3a, 3c in the region of blade section edges 8, due to azimuthal or tangential notches 11a, 11b and extend past circle radius 8 into particular recess 9.

Multi-part blade 4 illustrated in FIG. 2 also has circle segment-shaped blade sections 4a, which are molded onto central, annular blade section 4b via blade webs 5, as well as circle segment-shaped blade sections 4c, which are not molded onto central bade section 4b. Circle segment-shaped blade sections 4a, 4c only have notches 12. The latter are located in radial positions $R_1$ and $R_2$ according to the grid of blade 3 in FIG. 1.

In single-part blade 2 illustrated in FIG. 3, all circle segment-shaped blade sections 2a are molded onto central blade section 2b via blade webs 5. In this blade type, all circle segment-shaped blade sections 2a also only have notches 12, which, in turn, are provided with positions $R_1$ and $R_2$ in the same grid.

Each of circle segment-shaped blade sections of blades 2 through 4 occupies a partial surface, delimited by circle arc 7 and the two circle radii or blade section edges 8, which is equal to the partial surface of one circle segment-shaped blade section of other blades 2 through 4'. Since the blade sections of blades 2 through 4 are identical to each other, circle radii 7 and circle arcs 8 of all blade sections are aligned with each other in the stacked state of blades 2 through 4. Recesses 9 of all blades 2 through 4, which are also aligned with each other, form receiving pockets 16 (FIG. 7) extending in the axial direction along blade set center axis (central longitudinal axis), for which magnets 10 are disposed radially, i.e., in a star-shaped configuration, within rotor blade set 1.

Within rotor blade set or subset 1, at least the blades 3 provided with clips 11 are stacked, offset from each other or rotated around a circle segment angle α. Circle segment angle α is 360°, divided by the number a of blade sections 3a, 3c (α=360°/a). With a total of ten blade sections 3a, 3c (a=10), according to the exemplary embodiment, circle segment angle α=36°.

On the one hand, if five such blades 3 are each offset from each other by this circle segment angle α in the same direction of rotation, multiple clips 11, which may engage with corresponding notches 12, are located in each receiving pocket 16 in the axial direction. On the other hand, at least one radial clamping clip 14 is located in each receiving pocket 16, however in axially different positions or planes, as illustrated in FIGS. 7 and 8.

When permanent magnets 10 are inserted into particular receiving pocket 16, corresponding clamping clip 11 exists therefrom and clamps or presses particular magnet against undercut hook 13 in the region of circle radii 7. Likewise, clips 11 are bent axially during the course of inserting magnets 10 and engage with or enter axially adjacent notches 12, i.e., those which are located thereunder in blade set 1 or the subset. On the one hand, this fixes magnets 10 in place by clamping and, on the other hand, blades 3 of at least blade subset 1c are centered and joined together.

FIG. 6 shows an exemplary embodiment of the notch 12 or each one thereof. The dimensions of these are selected in such a way that corresponding clip 11 engages with this notch 12 with machining allowance. Notch 12 is preferably designed as a trapezoid, so that clip 11 projects over angled side edges 12a of notches 12 by their corner regions 11a on the free end. During the course of the bending and engagement of clip 11 with notch 12, at least clip 11 is deformed. However, a mutual deformation of clip 11 and notch 12 is preferably achieved. This results in a particularly reliable joint between affected, axially adjacent blades 3 or blade sections 3a, 3c.

The invention is not limited to the exemplary embodiment described above. Instead, other variants of the invention may be derived therefrom by those skilled in the art without going beyond the subject of the invention. Moreover, in particular, all individual features described in connection with the exemplary embodiment may also be otherwise combined with each other without going beyond the subject of the invention.

What is claimed is:

1. A rotor blade set for an electric motor, the rotor blade set comprising:
    a plurality of axially assembled, multi-part and single-part blades having blade sections, including radial and circumferentially open recesses between each blade section, the recesses receiving a plurality of magnets-magnet, wherein each blade section defines a circle sector of the rotor, and wherein at least one blade section of the multi-part blades is only connected to the plurality of magnets;
    at least one azimuthal clip provided on a circle radius side of a predefinable number of the blade sections of the single-part or multi-part blades, the azimuthal clip being axially bendable during a course of inserting a corresponding magnet into a particular recess; and
    at least one notch formed on the circle radius side of each blade section of the single-part or multi-part blades, with which a corresponding clip of a blade section of an axially spaced blade engages following the axial bending.

2. The rotor blade set according to claim 1, wherein the axially bendable clip of each blade section is formed by two notches introduced therein on the circle radius side and on both sides of the clip.

3. The rotor blade set according to claim 1, wherein the single-part blades have a central blade section forming a material recess for the passage of a shaft, on which the blade sections are molded via blade webs.

4. The rotor blade set according to claim 1, wherein the multi-part blades have a central blade section forming a material recess for the passage of a shaft, on which at least one or every second blade section is molded via a blade web.

5. The rotor blade set according to claim 1, wherein adjacent blade sections of at least one blade section pair or two blade section pairs, preferably an even-numbered multiple of two blade section pairs, of the multi-part blades each have one clip, which are positioned opposite, in particular diametrically opposed to, each other within the corresponding recesses.

6. The rotor blade set according to claim 5, wherein the clips of the blade sections are positioned, radially offset, adjacent to each other.

7. The rotor blade set according to claim 1, wherein a predefinable number of blade sections of the multi-part blades have at least one radial clamping clip or exactly two radial clamping clips disposed diametrically opposed to each other on a central blade section for fixing the magnets by clamping.

8. The rotor blade set according to claim 1, wherein the rotor blades, in particular the rotor blades provided with clips, are stacked, rotated with respect to each other around a circle segment angle.

9. The rotor blade set according to claim 1, wherein a shape of the notch, or the design of the clip, with machining allowance with respect to a particular notch, such that, during the course of the axial bending of the clip, the clip engages with the notch, and is deformed at least partially or in sections, including the mutual deformation of the clip and the notch.

10. The rotor blade set according to claim 1, wherein a number of blades, including at least one clip and at least one notch along a circle radii of their blade sections, such that, as a result of blades stacked, offset from each other, around at least one circle segment angle, blade sections are alternately disposed axially above each other within receiving pockets for the magnets, which are formed by the aligned recesses of the blades.

11. The rotor blade set according to claim 1, wherein two clips disposed opposite each other, are assigned to each recess.

12. The rotor blade set according to claim 1, wherein the single-part blades are alternated with the multi-part blades.

13. The rotor blade set according to claim 12, wherein at least two blade sections are connected to a rotor core and at least one blade section is only operatively connected to the magnets, the magnets being operatively connected to the rotor core.

14. The rotor blade set according to claim 1, wherein each blade section fills a solid angle of a cylindrical motor core such that the sum of solid angles of all blade sections in a single blade is less than 360 degrees.

15. The rotor blade set for an electric motor, including a number of axially assembled single-part and/or multi-part blades having blade sections, the blade sections including at least one axially bendable clip and/or at least one corresponding notch on a circle radius side, wherein between the blade sections are formed radial recesses for receiving at least one magnet, the blades being stacked in at least three blade subsets, and wherein at least one blade section is connected to the rotor only via contact with a corresponding pair of magnets.

16. The rotor blade set according to claim 15, wherein a first and a third blade subset are assembled only from multi-part blades without clips, and wherein a second blade subset is provided axially between the first and third blade subsets assembled from multi-part blades having clips.

17. The rotor blade set according to claim 15, wherein at least one single-part blade is provided on a front side or on both sides of the blade subsets.

18. A rotor blade set for an electric motor, the rotor blade set comprising:
    a plurality of axially-assembled rotor blades, each rotor blade including at least one circumferential central blade section and a plurality of circumferentially-assembled blade segments, the blade segments forming radial and circumferentially open recesses between each blade segment, the recesses receiving a plurality of magnets,
    wherein at least one of the blade segments is monolithically connected to the at least one central blade section, wherein each blade section defines a circle sector of the rotor blade, and wherein at least one of the blade segments is only connected to the central blade section via two of the plurality of magnets;
    at least one azimuthal clip provided on a circle radius side of a predefinable number of the blade segments, the azimuthal clip being axially bendable during a course of inserting a corresponding magnet into a particular recess; and at least one notch formed on the circle radius side of each blade segment and engaging one of the plurality of magnets.

19. A rotor blade set for an electric motor, the rotor blade set comprising:

a plurality of axially assembled, multi-part and/or single-part blades having circle-segment-shaped blade sections, between which radial and circumferentially open recesses are provided for receiving a magnet, at least one azimuthal clip provided on a circle radius side of a predefinable number of the circle segment-shaped blade sections of the single-part or multi-part blades, the azimuthal clip being axially bendable during a course of inserting a corresponding magnet into a particular recess; and at least one notch formed on the circle radius side of the circle segment-shaped blade sections of the single-part or multi-part blades, with which a corresponding clip of a blade section of an axially spaced blade engages following the axial bending, wherein a number of blades, including at least one clip and at least one notch along a circle radii of their circle segment-shaped blade sections, such that, as a result of blades stacked, offset from each other, around at least one circle segment angle, circle segment-shaped blade sections are alternately disposed axially above each other within receiving pockets for the magnets, which are formed by the aligned recesses of the blades.

* * * * *